METHOD OF MAKING ISOCOERCIVE MAGNETIC ALLOY COATINGS

Filed Nov. 16, 1965

INVENTORS
JOHN S. JUDGE
JOHN R. MORRISON
DENNIS E. SPELIOTIS

BY Donald W. Margolis
ATTORNEY 3,549,417

METHOD OF MAKING ISOCOERCIVE MAGNETIC ALLOY COATINGS

John S. Judge and John R. Morrison, Wappingers Falls, and Dennis E. Speliotis, Poughkeepsie, N.Y., assignors to International Business Machines Corporation, Armonk, N.Y., a corporation of New York Filed Nov. 16, 1965, Ser. No. 508,090
Int. Cl. C23c 3/02
U.S. Cl. 117—240 1 Claim

ABSTRACT OF THE DISCLOSURE

Thickness independent isocoercive magnetic alloys of 76–84% by weight cobalt, 14–22% by weight of nickel and 1–2% by weight of phosphorus produced, for example, by deposition from a chemical plating bath of the cobalt-nickel cation-hypophosphite anion type, including a ratio of cobalt cation concentration to nickel cation concentration on the order of about 4:1.

This invention relates to alloys and more particularly it relates to isocoercive magnetic alloys composed of cobalt, nickel and phosphorus. In addition, this invention relates to chemical plating baths of the cobalt-nickel cation-hypophosphite anion type from which isocoercive alloys of cobalt-nickel-phosphorus can be produced.

The coercivity of plated magnetic material produced by chemical reduction has previously been found to be substantially related to the thickness of the plated material. See, for example, Foley U.S. Pat. 3,138,479 and R. D. Fisher and W. H. Chilton, "Preparation and Magnetic Characteristics of Chemically Deposited Cobalt for High-Density Storage," Journal of the Electrochemical Society, vol. 109, 1962, p. 485. It has now been discovered that certain alloys of cobalt-nickel-phosphorus are substantially isocoercive with respect to varying thickness of the plated material. That is, certain alloys of cobalt-nickel-phosphorus have been discovered in which the coercivities of the alloys are independent of the thickness of the plated material.

Previously attempts have been made to produce magnetic recording media by chemical reduction techniques. However, recording media produced in this way have invariably been subject to non-uniformities in the thickness of the plated material. Of course, when dealing with non-isocoercive materials this leads to concomitant non-uniformities in the coercivity and other magnetic properties of the plated alloy which constitutes the magnetically susceptible material in the magnetic recording media. This results in magnetic recording media with local fluctuations in coercivity and other magnetic properties. The present invention eliminates such local variations in coercivity due to thickness fluctuations. In addition to avoiding fluctuations in coercivity in a single recording media, the present invention also avoids variations in coercivity which have previously been found to exist on a sample to sample basis due to variation in thickness from one fabrication to the next.

Another advantage of the alloys of the present invention, whose coercivities are thickness independent, are their very high coercivities. High coercivity, coupled with thinness of the recording medium is essential for high density recording of information. The thickness region of about 250 A. to about 2500 A. is apparently optimum for resolution of highly packed information.

Therefore, it is an object of the present invention to provide magnetic alloys which avoid the shortcomings of previously known magnetic material produced by chemical reduction in that it is isocoercive.

A further object of this invention is to provide magnetic alloys of cobalt-nickel-phosphorus which have high coercivities and in which the coercivities are independent of the thickness of the magnetic alloys.

Another object of this invention is to provide chemical reduction baths of the cobalt-nickel cation-hypophosphite anion type which are capable of producing isocoercive cobalt-nickel-phosphorus alloys.

Another object of the present invention is to provide methods of chemical reduction utilizing improved plating baths capable of producing isocoercive cobalt-nickel-phosphorus alloys.

The foregoing and other objects, features and advantages of the invention will be apparent from the following more particular description of preferred embodiments of the invention, as illustrated in the accompanying drawings in which.

The isocoercive alloys of the present invention consist of 76–84% by weight cobalt, 14–22% by weight nickel, the remainder being phosphorus. The cobalt-nickel-phosphorus alloys were prepared by chemical reduction from alkaline-tartrate electroless plating solutions of the cobalt-nickel cation-hypophosphite anion type. Small amounts of phosphorus are codeposited with the cobalt-nickel.

In parametric experimental work, films of cobalt-nickel-phosphorus, varying in composition from 30% cobalt to 100% cobalt, uncorrected for small phosphorus content on the order of 1–2%, and ranging in thickness from 250 A. to 2500 A. were prepared by chemical deposition. The films were deposited on polyester substrates which had been rendered hydrophilic by a two step process involving brief immersion first in hot chromic-sulfuric acid solution and then in hot sodium hydroxide solution in accordance with Koretzky et al. U.S. Pat. 3,142,582. The polyester substrates were then activated and sensitized with the usual $SnCl_2$–$PdCl_2$ treatment as described in Bergstrom U.S. Pat. No. 2,702,253. An alkaline-tartrate electroless plating solution was used for the deposition of the ferromagnetic constituents. The basic cobalt plating bath consists of:

Cobaltous chloride $CoCl_2$: 0.198 M
Sodium potassium tartrate $NaKC_4H_4O_6$: 0.71 M
Sodium hypophosphite $NaH_2PO_2$: 0.106 M
Ammonium chloride $NH_4Cl$: 0.935 M
pH: 7.9
Temperature: 85° C.

The pH and temperature of the solutions were maintained at a substantially constant level, ±0.05 pH units and ±0.5° C., throughout the depositions. Adjustment of the pH was made with 14% aqueous ammonia at operating temperatures. The composition of the plated materials was varied by adding appropriate amounts of nickel chloride to the basic cobalt plating bath. Nickel plated out of the solution preferentially, so that the percentage of nickel in the plated material increased approximately 1.4 times as fast as the percentage of nickel cation in the solution, as calculated with respect to the total cobalt and nickel cation concentration. Utilizing this information, fairly good precision in preparing alloys having a predetermined composition was possible.

The composition of the alloys produced ranged from 99% by weight of cobalt-1% by weight of phosphorous to films having a composition of 30% by weight of cobalt-68% by weight of nickel and 2% by weight of phosphorous. At each composition a thickness series was produced in the range of 250 A. to 2500 A.

Figure 1:
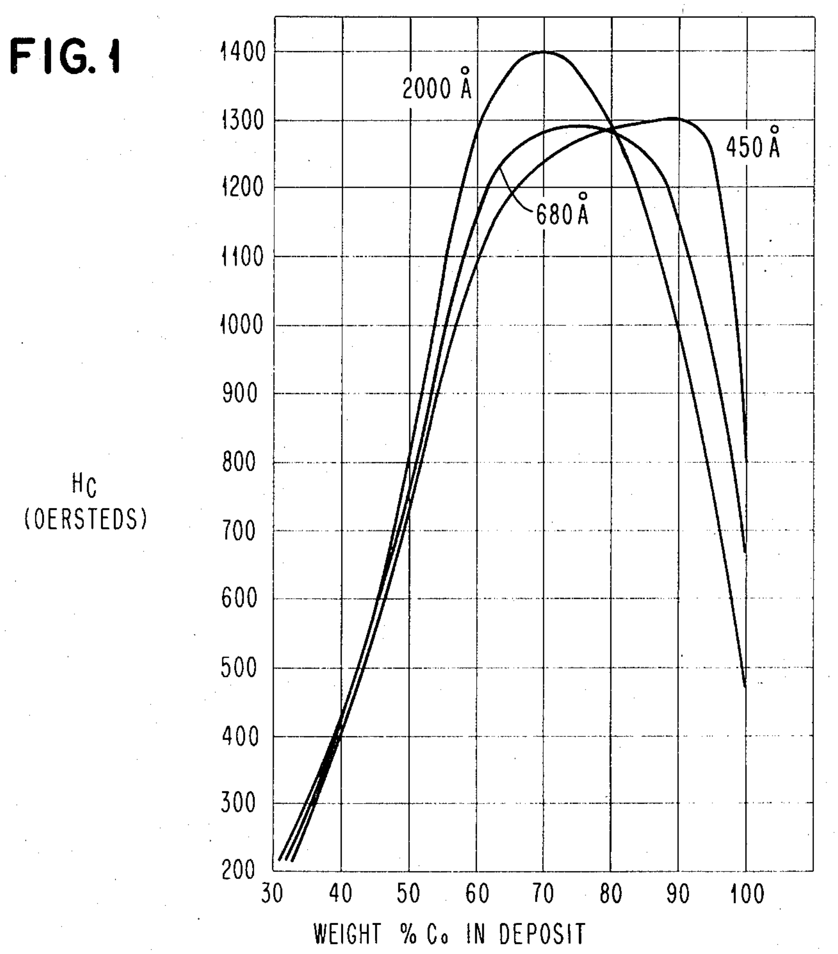
FIG. 1 shows a graph of coercivity, $H_c$, in oersteds versus composition of cobalt-nickel-phosphorus in terms of weight percent of cobalt.

The coercivity $H_c$ of the films were measured in a sensitive vibrating sample magnetometer. FIG. 1 shows the coercivity, $H_c$, of the plated material plotted against composition by weight percent of cobalt. Three different thicknesses series are shown. Thickness was determined by X-ray fluorescence. It is seen that, in the range of about 10% to about 30% nickel that, with decreasing cobalt content-increasing nickel content the coercivity of the plated samples generally increased. Outside of this range, in the range of more than about 30% nickel, the coercivity decreased rapidly. FIG. 1 is not corrected for the small amount, about 1% to about 2% by weight, of phosphorous present in the plated material.

Figure 2:
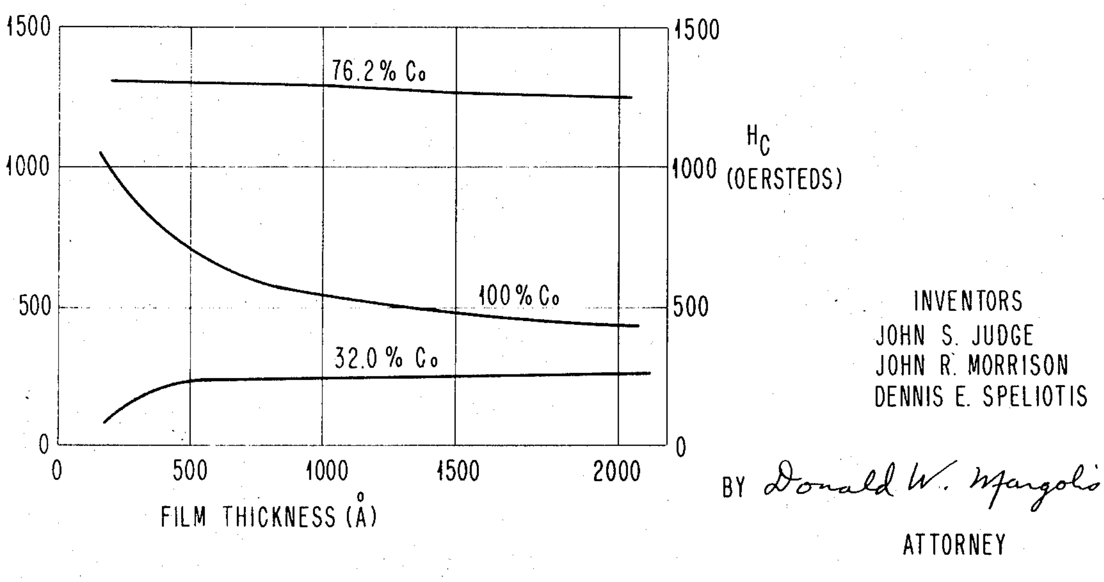
FIG. 2 shows a graph of coercivity, $H_c$, in oersteds versus film thickness in angstroms, A., for several cobalt containing plated materials.

A remarkable feature of this graph is the presence of an isocoercive point at a composition of approximately 80% by weight of cobalt. Surprisingly, at this point it is seen that the three thickness series converge indicating that there is no dependence of the coercivity on thickness for alloy compositions in this range. The existence of substantially isocoercive alloys and the importance of these alloys is more clearly demonstrated by considering FIG. 2. FIG. 2 shows the coercivity, $H_c$, of various alloy compositions plotted against the thickness of the film. In the 100% cobalt films, it is seen that the coercivity decreases substantially with increasing thickness over the range of 250 A. to 2000 A. This dependence on thickness becomes less and less pronounced as nickel is introduced into the alloy. The coercivity becomes independent of thickness in the vicinity of 80±40% by weight of cobalt-18±4% by weight of nickel. Thereafter, as is shown in the curve representing a composition containing 32% by weight of cobalt, the coercivity increases for alloys with higher nickel content, with increasing thickness, levelling off at higher thicknesses. FIG. 2 is not corrected for the small amount, about 1% to about 2% by weight, of phosphorous present in the plated material.

As shown in FIG. 2, an alloy made in accordance with the present invention containing 76.2% cobalt and 1.5% phosphorous is substantially isocoercive. This establishes an isocoercive alloy range having a variation of cobalt content on the order of about 4% by weight based on the total weight of the alloy.

Baths suitable for preparing isocoercive alloys in the range of 80% cobalt are:

Cobaltous chloride $CoCl_2$: 0.198 M
Nickel chloride $NiCl_2$: 0.048±.002 M
Sodium potassium tartrate $NaKC_4H_4O_6$: 0.71 M
Sodium hypophosphite $NaH_2PO_2$: 0.106 M
Ammonium chloride $NH_4Cl$: 0.935 M
pH: 7.9±.05
Temperature: 85±.5° C.

The isocoercive alloys produced have a coercivity in the range of about 1300 oersteds. This very high value of coercivity is of advantage for high density magnetic recording. As many as 60,000 flux changes per inch can be written on this alloy film, thus making it valuable as a high density information storage magnetic recording media. The term magnetic recording media includes, but is not limited to, tapes, disks, cylinders, loops, stripes, strips, and chips.

The magnetic characteristics of the alloys disclosed herein are a function of the crystallite size and structure of the alloy as well as a function of its composition. It is understood that, following the techniques illustrated in the present application, one skilled in the art could determine the existence and composition of isocoercive points for other families of plated magnetic materials. In the particular magnetic isocoercive alloys disclosed herein the crystallite size was on the order of about 1000 A. The alloys contain a mixture of face centered cubic and hexagonal phases and have a significant degree of orientation of the cubic (111) and hexagonal (002) axis perpendicular to the plane of the film.

The dependence of the coercivity on thickness may be explained on the basis of a semiparticulate model. The two important considerations are the size of the particles and the orientation of their crystallographic axis. In the high percent cobalt region the negative slope of the coercivity with increasing thickness is due to the decreasing effect of shape and the increasing presence of multidomain character with increasing particle size. In the region containing a high percent of nickel, the relative unimportance of crystallographic orientation and the gradual disappearance of superparamagnetic particles with increasing thickness result in a positive slope of the coercivity with increasing thickness. The compensation of these effects is believed to result in alloys having thickness independent coercivity in the range of 76 to 84% by weight of cobalt.

Particle size and the orientation of the crystallographic axis of the disclosed isocoercive alloys may be affected by noncomposition factors such as temperature, agitation of the bath, pH, rate of deposition and other factors. The variation of any of these factors will result in a variation of the size of the particles and the orientation of their crystallographic axis. Therefore, it is understood that one skilled in the art may, by the use of well known plating techniques, cause a variation in the particle size or crystallographic axis orientation resulting in isocoercive compositions outside of the alloy range experimentally determined and disclosed by the present application.

Similarly, one skilled in the art may utilize the techniques taught in the present application to determine the existence of chemically plated isocoercive alloys containing different or other materials than those disclosed herein. It is therefore seen, in view of the present disclosure, that the discovery and production of other isocoercive alloys produced by chemical or other plating techniques is completely anticipated herein.

While certain substrates and preplating steps have been disclosed in the present application they do not constitute a part of this invention and may be varied in accordance with the many presently known materials and techniques.

While the invention has been particularly shown and described with reference to preferred embodiments thereof, it will be understood by those skilled in the art that the foregoing and other modifications may be made therein without departing from the spirit and scope of the invention.

What is claimed is:

1. The method of producing coatings of magnetic isocoercive alloys composed of 76–84%, by weight, of cobalt, 14–22%, weight, of nickel, and 1–2%, by weight, of phosphorus by chemical plating, including the step of immersing a catalytic material in a bath consisting of cobalt cation having a concentration of about 0.198 M, nickel cation having a concentration of about 0.048 M, tartrate anion having a concentration of about 0.71 M, hypophosphite anion having a concentration of about 0.106 M, and ammonium ion from an ammonium salt having a concentration of about 0.935 M.

References Cited

UNITED STATES PATENTS

| | | | |
|---|---|---|---|
| 3,116,159 | 12/1963 | Fisher et al. | 117—130X |
| 3,150,939 | 9/1964 | Wenner | 117—71X |
| 3,212,918 | 10/1965 | Tsu et al. | 117—160X |
| 3,238,061 | 3/1966 | Koretzky et al. | 106—1X |
| 3,378,400 | 4/1968 | Sickles | 106—1X |

DONALD J. ARNOLD, Primary Examiner

L. B. HAYES, Assistant Examiner

U.S. Cl. X.R.

106—1; 117—47, 130, 160, 236